United States Patent

Masaike

[11] Patent Number: 5,153,712
[45] Date of Patent: Oct. 6, 1992

[54] APPARATUS FOR INSERTING COLOR CHARACTER DATA INTO COMPOSITE VIDEO SIGNAL

[75] Inventor: Yasufumi Masaike, Kanagawa, Japan

[73] Assignee: NEC Corporation, Tokyo, Japan

[21] Appl. No.: 775,016

[22] Filed: Oct. 11, 1991

[30] Foreign Application Priority Data

Oct. 11, 1990 [JP] Japan .................... 2-272766

[51] Int. Cl.$^5$ .............................. H04N 9/74
[52] U.S. Cl. ........................ 358/22; 358/147
[58] Field of Search ............... 358/22, 22 PIP, 21 R, 358/187, 183, 147, 142, 23; 340/748, 750

[56] References Cited

U.S. PATENT DOCUMENTS

| 4,409,626 | 10/1983 | Ferguson | 358/147 |
| 5,008,750 | 4/1991 | Gomikawa | 358/147 |
| 5,109,279 | 4/1992 | Ando | 358/183 |

Primary Examiner—Tommy P. Chin
Assistant Examiner—Sherrie Hsia
Attorney, Agent, or Firm—Sughrue, Mion, Zinn, Macpeak & Seas

[57] ABSTRACT

An apparatus for inserting color character data into a composite video signal, comprises a display controller determining a character display position on the basis of a horizontal synchronizing signal and a vertical synchronizing signal to generate a character generation timing signal and a character output timing signal. A character generator receives the character generation timing signal and generates a character color data signal and a character dot data signal, which are used for controlling the kind of a character to be displayed. A luminance signal generator receives the character color data signal and generates a luminance component control signal controlling a luminance component of the character to be displayed. A carrier chrominance signal generator receives the input composite video signal, the horizontal synchronizing signal and the character color data signal, and generates a carrier chrominance signal control clock which determines a phase of a carrier chrominance signal for the character to be displayed, on the basis of a color synchronization signal included in the input composite video signal. When the character dot data signal is active, a character output circuit generates a potential level in accordance with the luminance component control signal, and outputs the generated potential level in response to the carrier chrominance signal control clock, so that a character output data having an amplitude and a phase of a desired color is inserted into the input composite video signal in accordance with the character output timing signal.

4 Claims, 4 Drawing Sheets

APPARATUS FOR INSERTING COLOR CHARACTER DATA INTO COMPOSITE VIDEO SIGNAL

BACKGROUND OF THE INVENTION

1. Field of the Invention

The present invention relates to a color character indicating apparatus for use in a color display system operating with a composite video signal, and more specifically to an apparatus for inserting color character data into a composite video signal, used in a system such as a video tape recorder which does not use a so-called R.G.B signal.

2. Description of Related Art

A typical one of conventional character indicating apparatuses for use in a color display system operating with a composite video signal comprises a display controller receiving a horizontal synchronizing signal and a vertical synchronizing signal for generating a character generation timing signal and a character output timing signal. In response to the character generation timing signal, a character generator selectively activates a white output control signal and a black output control signal in accordance with character data generated within the character generator, so that a white potential level or black potential level is generated as an output character signal. This output character signal is outputted as an output composite video signal in place of an input composite video signal. Namely, the output character signal is inserted into the composite video signal. In this case, a displayed character is white or black in color which can be displayed with only a DC level.

In the case of a color character indication, the input composited composite video signal is converted into a digital signal by an A/D converter. On the other hand, a display controller receives a horizontal synchronizing signal and a vertical synchronizing signal and generates a character generation timing signal and a character output timing signal, and a character generator receiving the character generation timing signal generates a R (red) signal, a G(green) signal and a B (blue) signal in accordance with character data generated within the character generator. In a data mixer or data synthesis circuit, the digitized composite video signal is mixed with the R, G and B signals in response to the character output timing signal, and the synthesized digital signal is converted into an analog composite video signal by a D/A converter.

As known, a video data portion of a composite video signal is a synthesis signal composed of a luminance signal and a carrier chrominance signal, and a color is represented by a DC component level of the luminance signal, and a phase difference of the carrier chrominance signal from a color synchronization signal and an amplitude of the carrier chrominance signal.

In the first example of the above mentioned conventional character indicating apparatus, since the signal of only the DC level having no amplitude is inserted into the composite video signal, a character displayed on a screen is a black-and-white character. Accordingly, it is not possible to display a colored character.

The second example configured to be capable of indicating a colored character, has to include the A/D converter and the D/A converter, which ar required to be have a high degree of precision in order to prevent deterioration of quality of an image to be displayed. Therefore, it is inevitably expensive.

SUMMARY OF THE INVENTION

Accordingly, it is an object of the present invention to provide a character indicating apparatus which has overcome the above mentioned defect of the conventional ones.

Another object of the present invention is to provide a character indicating apparatus capable of indicating a colored character with requiring neither the A/D converter nor the D/A converter.

The above and other objects of the present invention are achieved in accordance with the present invention by an apparatus for inserting color character data into a composite video signal, comprising:

a display controller receiving a horizontal synchronizing signal and a vertical synchronizing signal so as to determine a character display position on the basis of said horizontal synchronizing signal and said vertical synchronizing signal, said display controller generating a character generation timing signal and a character output timing signal for inserting character data into an input composite video signal;

a character generator receiving said character generation timing signal for generating a character color data signal and a character dot data signal, which are used for controlling the kind of a character to be displayed;

a luminance signal generator receiving said character color data signal for generating a luminance component control signal controlling a luminance component of said character to be displayed;

a carrier chrominance signal generator receiving said input composite video signal, said horizontal synchronizing signal and said character color data signal for generating a carrier chrominance signal control clock which determines a phase of a carrier chrominance signal for said character to be displayed, on the basis of a color synchronization signal included in said input composite video signal; and a character output circuit receiving said character dot data signal, said luminance component control signal and said carrier chrominance signal control clock for generating a potential level in accordance with said luminance component control signal, and for outputting said potential level in response to said carrier chrominance signal control clock, so that a character output data having an amplitude and a phase of a desired color in inserted into said input composite video signal.

The above and other objects, features and advantages of the present invention will be apparent from the following description of preferred embodiments of the invention with reference to the accompanying drawings.

DESCRIPTION OF THE PREFERRED EMBODIMENTS

Figure 1:
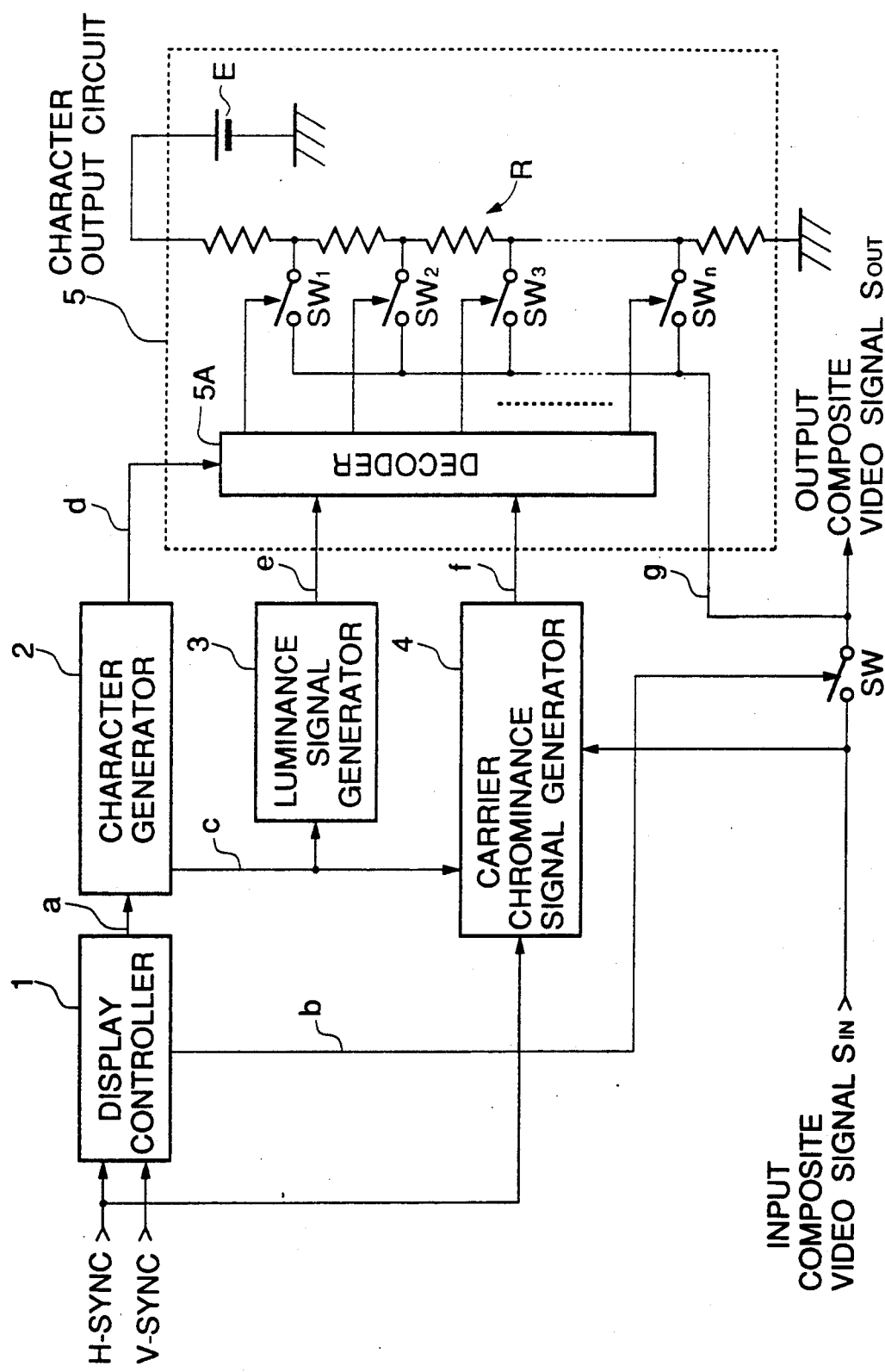
FIG. 1 is a block diagram of an embodiment of the character indicating apparatus in accordance with the present invention.

Referring to FIG. 1, there is shown a block diagram of an embodiment of the character indicating apparatus in accordance with the present invention. The shown character indicating apparatus is configured to insert color character data into a composite video signal.

The shown apparatus includes a display controller 1 receiving a horizontal synchronizing signal H-SYNC and a vertical synchronizing signal V-SYNC for determining a character display position, in a horizontal direction by counting a self-oscillated clock using the horizontal synchronizing signal H-SYNC as a reference, and in a vertical direction by counting the horizontal synchronizing signal H-SYNC using the vertical synchronizing signal V-SYNC as a reference. On the basis of the character display position thus determined, this display controller generates a character generation timing signal "a" used for controlling a character generation timing and a character output timing signal "b" for inserting character data in place of an input composite video signal Sin. The character generation timing signal "a" is applied to a character generator 2, and the character output timing signal "b" is supplied as a control signal for a switch SW connected between a composite video signal input Sin and a composite video signal output Sout.

The character generator 2 reads out, from an associated memory (now shown), ON/OFF data of each of dots constituting a character to be displayed, and color data of the character to be displayed. In response to the character generation timing signal "a", the character generator 2 outputs a character color data "c" to a luminance signal generator 3 and a carrier chrominance signal generator 4, respectively, and also outputs a dot ON/OFF character data "d" to a character output circuit 5.

On the basis of the character color data "c", the luminance signal generator 3 generates a luminance component control data "e" including information of a luminance component of a character color and information of an amplitude of a carrier chrominance signal.

The carrier chrominance signal generator 4 receives the input composite video signal Sin and the horizontal synchronizing signal H-SYNC in addition to the character color data "c", and generates a carrier chrominance signal control clock "f" in synchronization with a color synchronization signal included in the input composite video signal Sin.

Figure 2:
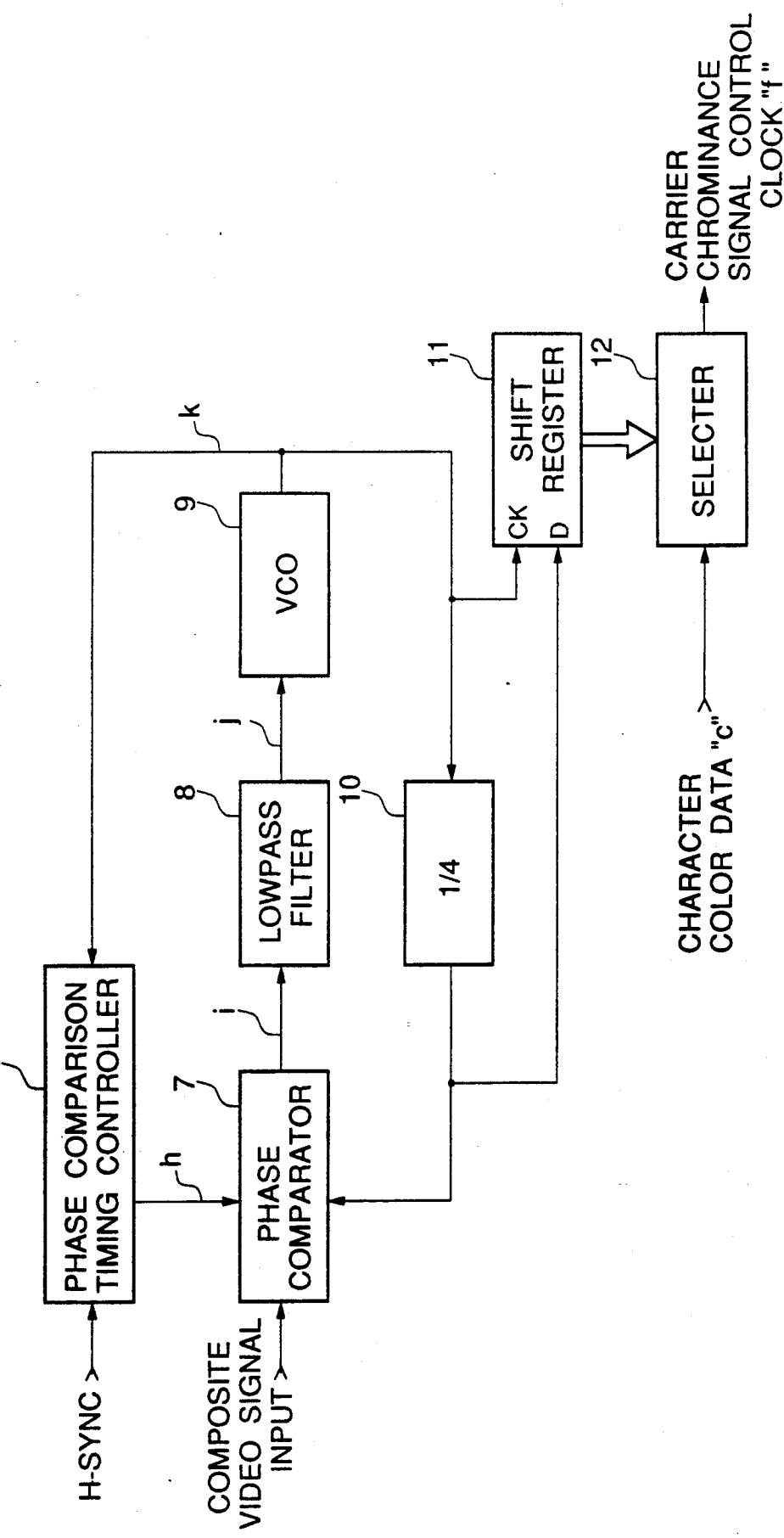
FIG. 2 is a block diagram of the carrier chrominance signal generator included in the apparatus shown in FIG. 1.

Referring to FIG. 2, the carrier chrominance signal generator 4 is constituted in the form of a PLL (phase lock loop) circuit. The carrier chrominance signal generator 4 includes a phase comparator 7 for comparing the input composite video signal Sin with an output signal of a frequency divider 10 which operates to frequency-divide an output signal "k" of a voltage controlled oscillator (VCO) 9 by 4. Here, as well known, the voltage controlled oscillator operates to change its oscillation frequency dependently upon an input direct current voltage.

On the other hand, as also well known, in a video data portion of the composite video signal, a phase of a carrier chrominance signal changes in accordance with a color of an image. Therefore, a phase comparison timing controller 6, which receives the horizontal synchronizing signal H-SYNC and the output signal "k" of the voltage controlled oscillator 9, operates to count the output signal of the voltage controlled oscillator 9 by using the horizontal synchronizing signal H-SYNC as a reference, and to output a color synchronization signal pick-up signal "h" to the phase comparator 7. Thus, the phase comparator 7 outputs a phase difference signal or an error signal "i" (the result of phase comparison) to a low pass filter 8 only at the timing of the color synchronization signal. At the other timings, the output of the phase comparator 7 assumes a high impedance. The low pass filter 8 outputs a VCO control voltage "j" to the voltage controlled oscillator 9. Accordingly, the error signal output timing is controlled by the phase comparison timing controller 6, and on the other hand, the voltage controlled oscillator 9 generates a signal "k" which is in synchronism with the color synchronization signal and which has a frequency four times as that of the color synchronization signal.

An amplitude of the color synchronization signal included in the composite video signal (which is one of two factors to be compared in phase) is as small as 286 m $V_{p-p}$. If this small signal were compared after it is amplified, a color phase shift would occur because of a phase delay generated in the process of amplification. Because of this, the phase comparator 7 is constituted of an analog differential amplifier circuit as shown in FIG. 3.

Figure 3:
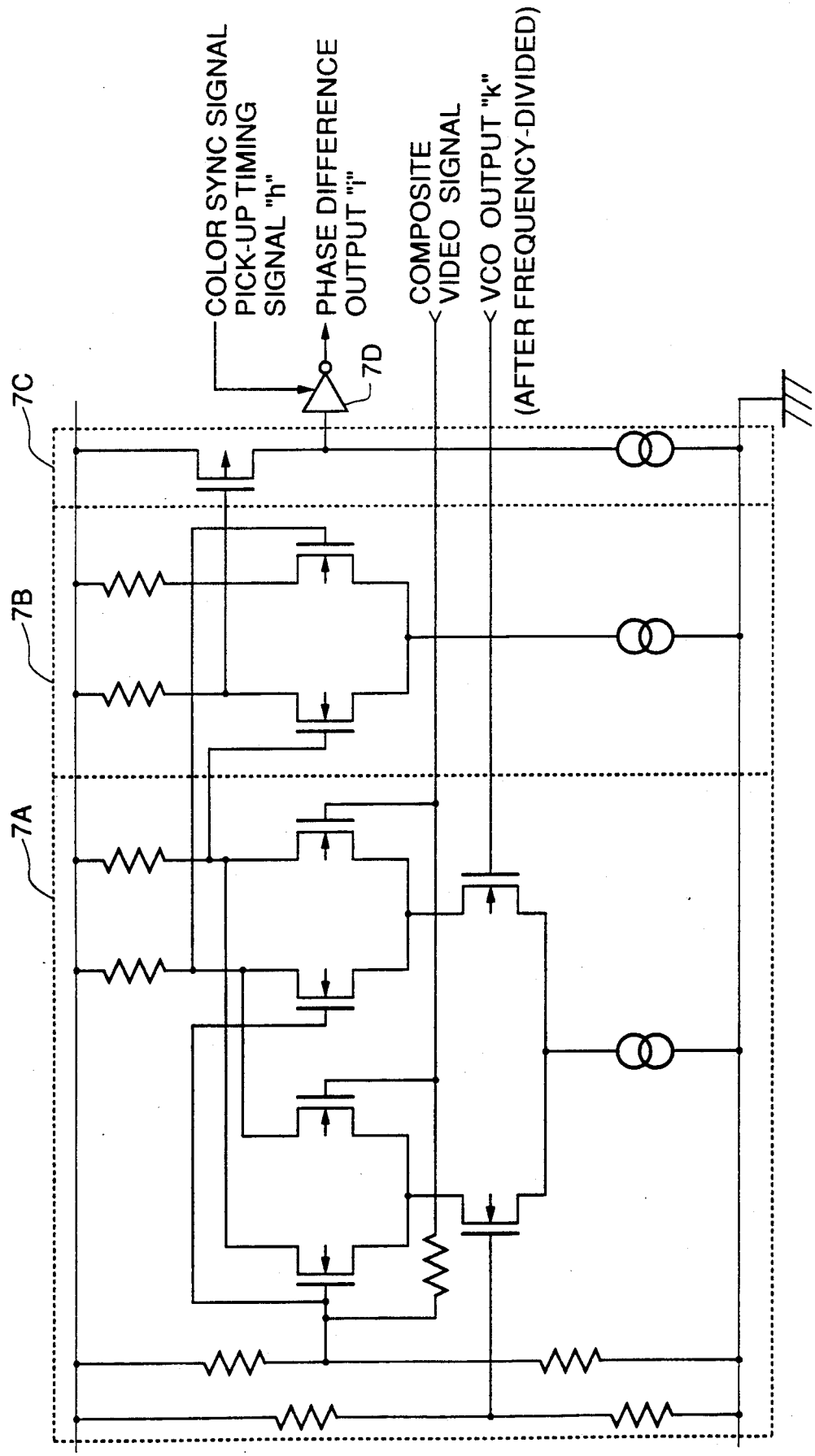
FIG. 3 is a circuit diagram of the phase comparator shown in circuit shown in FIG. 2.

As shown in FIG. 3, the input composite video signal is supplied to one input of a balanced modulation type phase comparator 7A, which has a second input receiving the output signal "k" of the voltage controlled oscillator 9 frequency-divided by the frequency divider 10, so that a logic of the balanced modulation type phase comparator 7A is controlled or switched, and the color synchronization signal is subjected to an analog phase comparison. An output of the balanced modulation type phase comparator 7A is supplied through a level shift circuit 7B to a source follower output circuit 7C, which has an output supplied as the phase difference signal "i" through a controlled buffer 7D controlled by the color synchronization signal pick-up timing signal "h".

The voltage control oscillator 9 oscillates a frequency four times the color subcarrier frequency $f_{sc}$ (which is a frequency when the color synchronization signal is deemed as a continuous wave). Under the NTSC standard, since $f_{sc} = 3.579545$ MHz, the voltage control oscillator 9 is preferred to stably oscillate at $4 \cdot f_{sc} = 14.31818$ MHz, and to have a capture range of ±5 KHz for the phase locked loop.

Figure 4:
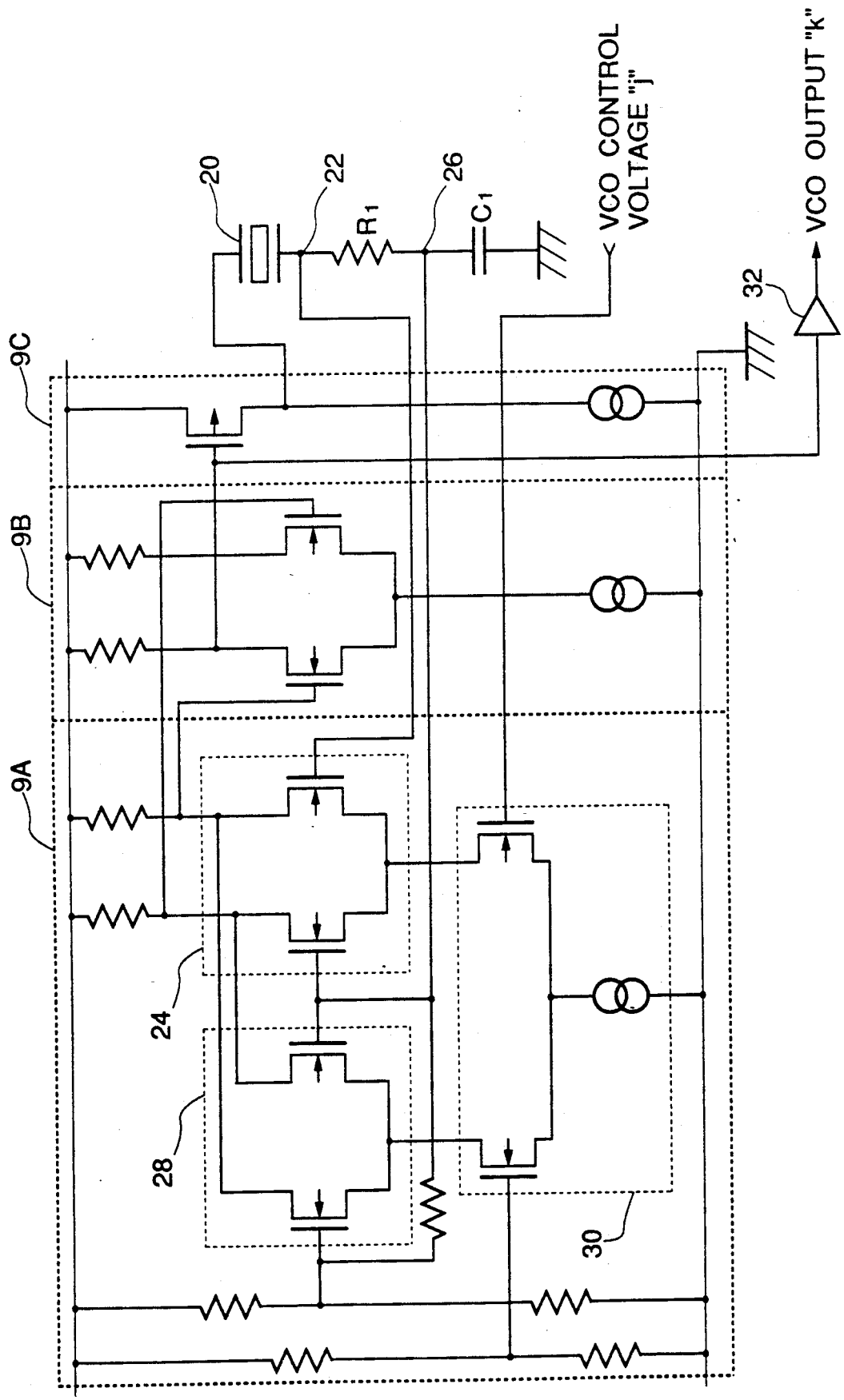
FIG. 4 is a circuit diagram of the voltage controlled oscillator shown in circuit shown in FIG. 2.

For this purpose, the voltage control oscillator 9 is constituted of a double-balanced crystal oscillator as shown in FIG. 4. Namely, the voltage control oscillator 9 is composed of a double-balanced differential amplifier 9A, a level shift circuit 9B, and a source follower circuit 9C. An output of the source follower circuit 9C is connected to one end of a quartz-crystal oscillator 20, which in turn has the other end 22 connected to one input of a first differential stage 24 of the double-balanced differential amplifier 9A. In order to generate a signal which is delayed by 45° in phase from a signal appearing on the other end 22 of the quartz-crystal oscillator 20, a series circuit composed of a resistor $R_1$ and a capacitor $C_1$ is connected to the other end 22 of the quartz-crystal oscillator 20. A 45° phase-delayed signal is supplied from a connection node 26 between the resistor $R_1$ and the capacitor $C_1$ to the other input of the first differential stage 24. Thus, the oscillation signal appearing on the other end 22 of the quartz-crystal oscillator 20 and the 45° phase-delayed signal thereof are voltage-compared by the first differential stage 24.

On the other hand, a second differential stage 28 voltage-compares the 45° phase-delayed signal with a biasing level given by a resister divider. The first and second differential stages 24 and 28 are controlled by a third differential stage 30 controlled by the VCO control voltage "j", so that a mixing ratio of the two voltage comparison results given by the first and second differential stage 24 and 28 is controlled by the VCO control voltage "j". The mixed voltage comparison result is outputted through the level shift circuit 9B and through a buffer 32 as the voltage controlled oscillator output "k". In addition, the mixed voltage comparison result is applied through the level shift circuit 9B and through the source follower 9C to the quartz-crystal oscillator 20. Thus, the oscillating loop capable of controlling the output phase in the range of ±45° can be constituted.

As mentioned above, since the voltage controlled oscillator 9 oscillate at $4 \cdot f_{sc}$, the output signal of the voltage controlled oscillator 9 is frequency-divided by four, and the frequency-divided signal is supplied to a data input "D" of a shift register 11. In addition, the output signal of the voltage controlled oscillator 9 s supplied to a clock input "CK" of the shift register 11. This shift register is shift-driven by both of a rising edge and a falling edge of each of the output signal of the voltage controlled oscillator 9. With this arrangement, eight signals having the same frequency of $f_{sc}$ and a phase different from each other, can be obtained from respective stages of the shift register 11. These eight phase signals are supplied to a selector 12, and one of the eight phase signals is selected as the carrier chrominance signal control clock "f" in accordance with the character color data signal "c" from the character generator 2. In this embodiment, the frequency of the voltage controlled oscillator 9 is $4 \cdot f_{sc}$, but can be made to $n \cdot f_{sc}$, (where "n" is positive integer) so that color phases for $2 \cdot n$ different colors can be generated.

The character output circuit 5 includes a ladder resistor R connected at its one end to a direct current voltage E and grounded at its other end. The ladder resistor R has taps of the number corresponding to the number of direct current voltage levels required for color display. The respective taps of the ladder resistor R are connected through switches SWi (i=1 to n) to the composite video signal output terminal Sout.

These switches SWi are controlled by a decoder 5A. This decoder 5A is activated in response to the dot ON/OFF character data "d" so as to decode the luminance component data "e" and to select two switches of the switches SWi, one of which outputs a "H" (high) level for a character signal "g" in the form of a pulse signal to be outputted, and other of which outputs a "L" (low) level for the character signal "g" to be outputted. The two selected switches are alternately turned on in synchronism with the carrier chrominance signal control clock "f" (when one of the two selected switches is turned on, the other switch is turned off, and when one of the two selected switches is turned off, the other switch is turned on), so that the character signal "g" having a luminance component and a color component of a desired color is inserted into the output composite video signal Sout. When the two selected switches of the switches $SW_1$ to SWn are alternately turned on, the switch SW is turned off. Thus, if the output composite video signal Sout is reproduced, a colored character is displayed on the screen.

As seen from the above, the character indicating apparatus in accordance with the present invention can generate a signal having any amplitude and any phase in synchronism with a color synchronization signal included in a composite video signal to be inserted with a character. With this feature, the character indicating apparatus in accordance with the present invention can not only comply with the composite video signal but also output a colored character without requiring the A/D converter and the D/A converter.

The invention has thus been shown and described with reference to the specific embodiments. However, it should be noted that the present invention in no way limited to the details of the illustrated structures but changes and modifications may be made within the scope of the appended claims.

What is claimed is:

1. An apparatus for inserting color character data into a composite video signal, including:
    a display controller receiving a horizontal synchronizing signal and a vertical synchronizing signal so as to determine a character display position on the basis of said horizontal synchronizing signal and said vertical synchronizing signal, said display controller generating a character generation timing signal and a character output timing signal for inserting character data into an input composite video signal;
    a character generator receiving said character generation timing signal for generating a character color data signal and a character dot data signal, which are used for controlling the kind of a character to be displayed;
    a luminance signal generator receiving said character color data signal for generating a luminance component control signal controlling a luminance component of said character to be displayed;
    a carrier chrominance signal generator receiving said input composite video signal, said horizontal synchronizing signal and said character color data signal for generating a carrier chrominance signal control clock which determines a phase of a carrier chrominance signal for said character to be displayed, on the basis of a color synchronization signal included in said input composite video signal; and
    a character output circuit receiving said character dot data signal, said luminance component control signal and said carrier chrominance signal control clock for generating a potential level in accordance with said luminance component control signal, and for outputting said potential level in response to said carrier chrominance signal control clock, so that a character output data having an amplitude and a phase of a desired color is inserted into said input composite video signal.

2. An apparatus claimed in claim 1 wherein said carrier chrominance signal generator includes:
    a voltage controlled oscillator;
    a phase comparison timing control circuit receiving an output of said voltage controlled oscillator and said horizontal synchronizing signal for generating a color synchronization signal pick-up timing signal;
    a frequency divider receiving said output of said voltage controlled oscillator;

a phase comparator receiving an output of said frequency divider and said input composite video signal and for generating a phase difference signal in response to said color synchronization signal pick-up timing signal;

a low pass filter receiving said phase difference signal for outputting a phase difference voltage signal to said voltage controlled oscillator;

a shift register having a data input receiving said output of said frequency divider and a clock input receiving said output of said voltage controlled oscillator; and a selector receiving, in parallel, outputs of respective stages of said shift register as phase signals having a phase different from each other, and controlled by said color data signal so as to select one of the received phase signals in accordance with said color data signal and to output the selected phase signal as said carrier chrominance signal control clock.

3. An apparatus claimed in claim 2 wherein said phase comparator includes a balanced modulation type phase comparator having a first input receiving said input composite video signal and a second input receiving said output of said frequency divider, and a buffer receiving an output of said balanced modulation type phase comparator and controlled by said color synchronization signal pick-up timing signal so as to output said output of said balanced modulation type phase comparator as said phase difference signal when said color synchronization signal pick-up timing signal is active.

4. An apparatus claimed in claim 2 wherein said voltage controlled oscillator is a double-balanced crystal oscillator.

* * * * *